(No Model.)
C. F. PIKE.
EXPANSION JOINT FOR PNEUMATIC DESPATCH TUBES.
No. 590,771. Patented Sept. 28, 1897.
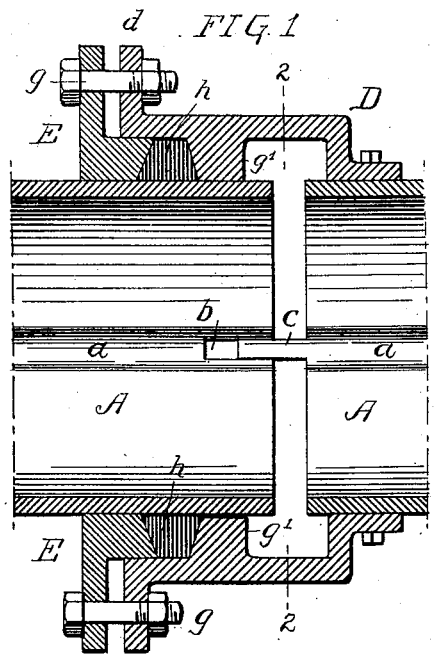
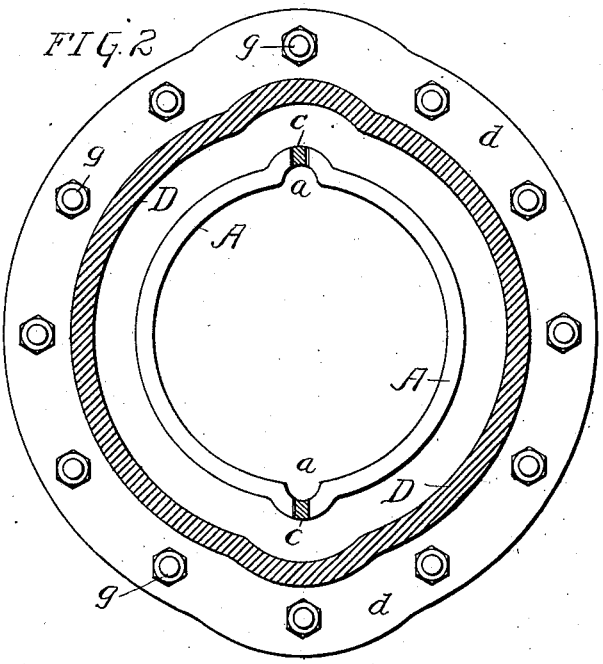
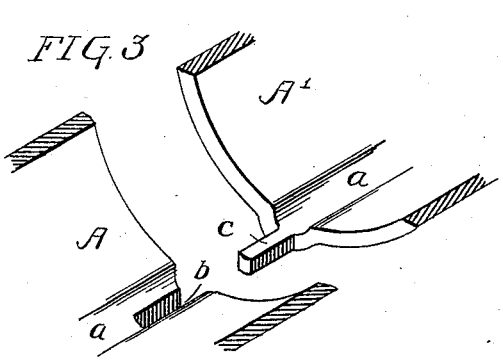
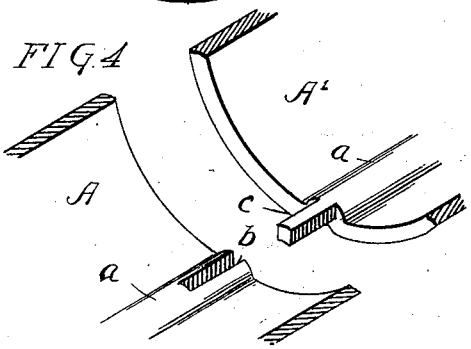
Witnesses:
Jno. E. Parker
Thomas Killian
Inventor:
Charles F. Pike
by his Attorneys,
Wm. A. Pike & Aimee Pettit

UNITED STATES PATENT OFFICE.

CHARLES F. PIKE, OF PHILADELPHIA, PENNSYLVANIA.

EXPANSION-JOINT FOR PNEUMATIC-DESPATCH TUBES.

SPECIFICATION forming part of Letters Patent No. 590,771, dated September 28, 1897.

Application filed January 11, 1897. Serial No. 618,689. (No model.)

*To all whom it may concern:*

Be it known that I, CHARLES F. PIKE, a citizen of the United States, and a resident of the city of Philadelphia, State of Pennsylvania, have invented certain new and useful Improvements in Expansion-Joints for Pneumatic-Despatch Tubes, of which the following is a full, clear, and exact description, reference being had to the accompanying drawings, forming part of this specification.

My invention relates to certain improvements in pneumatic-despatch tubes, and has for its object to provide an improved form of joint or coupling which will permit the expansion and contraction of the tube without forming any break in the tracks or guideways for the carrier, and, further, to prevent any escape of air from or entrance of air to the tube, as more fully set forth hereinafter.

In the accompanying drawings, Figure 1 is a sectional plan view of a portion of a pneumatic tube illustrating an expansion-joint constructed in accordance with my invention. Fig. 2 is a transverse sectional elevation of the same on the line 2 2, Fig. 1. Fig. 3 is a detached perspective view of a portion of the tube ends; and Fig. 4 is a view similar to Fig. 3, illustrating the application of the invention to a pneumatic tube having ribbed rails or guides.

In pneumatic-despatch tube systems where the tube is exposed to the weather, as in the crossing of bridges, &c., the tube will contract and expand to some considerable extent, being two or more inches in length per mile during the summer season than it is in cold weather, and some provision must be made for taking up this expansion and contraction without breaking joint between sections of the tube in such manner as to form a broken or disconnected surface for the passage of the carrier, and, further, the joints must be perfectly air-tight to prevent any communication between the interior of the tube and the outer air. This is particularly the case where in tubes of large diameter the carrier is provided with supporting-wheels to decrease its frictional contact with the interior of the tube, as in such cases the rails or guideways for the carrier-wheels must be continuous and unbroken in order to prevent breaking of the wheels or the derailing of the same.

In the accompanying drawings, A A' represent the adjacent end sections of a pneumatic-despatch tube, said tube being provided throughout its entire length with upper and lower grooved trackways $a$ for the reception and guidance of the wheels of the carrier. The ends of the tube-sections are separated for a distance sufficient to permit the tube to expand to the greatest possible distance without bringing the adjacent ends of the tube into close contact, and the whole line of tubing is free to expand and contract under the varying atmospheric conditions.

In the section A are formed two recesses $b$, one at each of the grooved trackways, the width of the recess being less than the width of the groove, so that on each side of such recess there will be left a sufficient width of the trackway which such groove forms to support the carrier-wheel. The carrier-wheel is of such width or thickness that it will normally occupy nearly all of the surface formed by the groove, and the removal of the metal at the center of the groove to form the recess will not interfere with the support afforded the wheel. From the ends of the tube-section A' project tongues $c$, of a width slightly less than the width of the recesses $b$, the tongues being formed in line with and practically a continuation, of contracted width, of the rail formed by the grooves $a$. The tongues $c$ fit into the recesses $b$, and thus preserve a continuous rail or guide for the support of the carrier-wheel, so that the latter has a continuous unbroken track or guide extending throughout the length of the entire tube system, and the contraction or expansion and the consequent separation of the adjacent ends of the sections of the tube will not in any manner interfere with the travel of the carrier.

In the construction illustrated in Fig. 4 the supporting-track $a$ is in the form of a rounded rib projecting into the interior of the tube, as contradistinguished from the rounded groove which forms the trackways or guides illustrated in Figs. 1, 2, and 3. Where the rounded rib is employed, as in Fig. 4, the carrier-wheel has a grooved periphery to accommodate itself to the ribbed rail, as will be readily understood.

The invention is also applicable to that class of pneumatic-despatch tubes which are provided with a smooth circular bore without trackways or guides and adapted for the passage of a cylindrical carrier fitting more or less closely within the tube.

In order to permit the movement of the tube-sections in expanding and contracting without danger of leakage, I provide on one section, as A', a box D, having a flanged end $d$, to which is secured a gland E, by means of a series of bolts $g$, and a suitable gasket $h$ is interposed between the flange $g'$ of the gland and an internal rib $h'$, formed on the box D. By this means the gasket may be tightened as from time to time may be required, while the free movement of the tube-sections is permitted without danger of the escape of air from or entrance to the pipe.

Having thus described my invention, what I claim, and desire to secure by Letters Patent, is—

1. An expansion-joint for pneumatic-despatch-tube systems comprising adjacent tube-sections having trackways or guides for the support and guidance of a wheeled carrier, the trackway or guide at the end of one section being recessed or cut away for a portion of its width, and the trackway of the opposite section being extended in the form of a contracted tongue adapted to enter the recess in the trackway or guide of the first section, substantially as specified.

2. An expansion-joint for pneumatic-despatch tubes comprising adjacent tube-sections, A, A', each having guiding-tracks, $a$, for the support and guidance of the carrier, there being a recess, $b$, formed at the end of the section, A, in line with but of less width than the trackway, $a$, a tongue, $c$, projecting from the end of the tube-section, A', in line with and forming a continuation of the trackway, the said tongue being adapted to enter the recess, $b$, a box or casing secured to the section, A', gasket, $h$, a gland, E, for confining such gasket in position and securing-bolts, $g$, for securing said gland to the flanged end of said box or casing, substantially as specified.

In witness whereof I have hereunto set my hand this 9th day of January, A. D. 1897.

CHARLES F. PIKE.

Witnesses:
 WM. A. PIKE,
 W. S. FURST.